(12) United States Patent
Hu

(10) Patent No.: US 7,553,749 B2
(45) Date of Patent: Jun. 30, 2009

(54) METHOD OF HIDING TRANSPARENT ELECTRODES ON A TRANSPARENT SUBSTRATE

(75) Inventor: Chun-Min Hu, Keelung (TW)

(73) Assignee: TPK Touch Solutions Inc., Taipei (TW)

(*) Notice: Subject to any disclaimer, the term of this patent is extended or adjusted under 35 U.S.C. 154(b) by 348 days.

(21) Appl. No.: 11/501,805

(22) Filed: Aug. 10, 2006

(65) Prior Publication Data

US 2007/0264844 A1 Nov. 15, 2007

(30) Foreign Application Priority Data

May 10, 2006 (TW) .............................. 95116533 A

(51) Int. Cl.
*H01L 21/44* (2006.01)
(52) U.S. Cl. .................. 438/609; 438/778; 257/E21.44
(58) Field of Classification Search ................. 438/609, 438/778
See application file for complete search history.

(56) References Cited

U.S. PATENT DOCUMENTS 6,439,943 B1  8/2002  Aoki et al.
2002/0028571 A1*  3/2002  Cheung ....................... 438/609
2002/0086188 A1  7/2002  Halsey, IV et al.
2004/0137240 A1  7/2004  Halsey, IV et al.
2006/0003188 A1*  1/2006  Ohno et al. .................. 428/701
2006/0046460 A1*  3/2006  Shu ............................. 438/608
2006/0049419 A1*  3/2006  Tanaka et al. ................. 257/98
2006/0097260 A1*  5/2006  Huang ......................... 257/66

FOREIGN PATENT DOCUMENTS

EP     1498259 A1     7/2004

* cited by examiner

*Primary Examiner*—Phat X Cao
*Assistant Examiner*—Nga Doan
(74) *Attorney, Agent, or Firm*—Rosenberg, Klein & Lee

(57) ABSTRACT

A method of hiding transparent electrodes on a transparent substrate coats a solution of non-conductive nanoparticles onto the transparent substrate and the transparent electrodes after forming a plurality of transparent electrodes on the transparent substrate, and both non-conductive nanoparticles and transparent electrodes have the same reflective index of light. After a high-temperature thermal processing is performed to the transparent substrate, an even mask is formed on the transparent substrate and the transparent electrodes, such that the non-conductive nanoparticles in the mask provide the same reflective index of light for the positions of the transparent substrate with and without the transparent electrodes, so as to effectively prevent a different reflective index of light at any position of the transparent substrate that will cause a poor image quality of the screen.

14 Claims, 5 Drawing Sheets

METHOD OF HIDING TRANSPARENT ELECTRODES ON A TRANSPARENT SUBSTRATE

FIELD OF THE INVENTION

The present invention relates to a method of hiding transparent electrodes on a transparent substrate, and more particularly to a method that coats a solution of non-conductive nanoparticles onto a transparent substrate to prevent a different refractive index of light at any position of the transparent substrate that will cause a poor image quality of the screen.

BACKGROUND OF THE INVENTION

In recent years, technology advancement reflected to various different products, particularly the electronic, information, and communication products. These products not only come with innovative designs, structures and functions, but also meet the requirements for user-friendly application and input method as well as providing diversified features. The development of a touch panel has changed the input mode of the traditional electronic products, so that users are no longer restricted by a traditional input device (such as a press key or a mouse for inputting data or operating instructions). A user may use the user-friendly input interface of a touch panel and follows the functional icon on a screen to select the desired function. The selection can be performed either by using a finger or a touch pen to execute a task without going through special training and learning. Currently, touch panels are used extensively in different personal electronic products such as a palm-sized PC, a personal digital assistant (PDA), and an information appliance. These products are used in public information stations for the medical treatment, traffic, travel and education related areas, such that the scope of the applicability and the market requirements of the touch panels tend to be expanded continuously.

In general, a touch panel produced by installing an ITO film onto a transparent glass substrate to form an ITO glass that generally operates together with a flat cable and a circuit board, and a control IC installed on the circuit board executes a control instruction according to the corresponding position pressed by a user, so as to achieve the purpose of inputting data and instruction through the touch panel. Since these touch panels are commonly installed for various different electronic products as a liquid crystal display (LCD), users can press the touch panel to input data and instruction without requiring to install traditional input devices (including a keyboard and a mouse) in order to save more working space or install a larger display panel to facilitate users to browse or input data.

In view of the description above, the ITO glass is a major component of the touch panel, and the ITO glass comprises a transparent glass substrate and a transparent conducting layer. In the fabrication of an ITO glass, an electrically insulating transparent glass substrate is coated with a layer of transparent conducting metal material, and the transparent conducting layer is formed on the transparent glass substrate. In general, the transparent conducting layer is made of indium tin oxide (ITO) and the transparent conducting layer is comprised of a plurality of ITO transparent electrodes disposed on the transparent glass substrate. Referring to FIG. 1 for a detailed description of the structure of the ITO glass, the manufacturing process of the ITO glass is described as follows:

(101) Rinsing: Before the transparent glass substrate is manufactured, it is necessary to rinse the surface of the transparent glass substrate to remove any dust and particle attached on the transparent glass substrate.

(Step 102) Coating: An indium tin oxide film is coated onto a lateral surface of the transparent glass substrate;

(Step 103) Coating a photoresist (P/R) layer: A layer of photoresist material is coated onto the transparent glass substrate having the indium tin oxide film by roller printing.

(Step 104) Prebake: The transparent glass substrate is heated slowly to coat and fix the photoresist layer onto the transparent glass substrate and prepare for the following processes.

(Step 105) Exposure: A fixed amount of ultraviolet (UV) light is projected onto the photoresist layer of the transparent glass substrate for a chemical reaction with the photoresist layer to form a masked pattern area and an exposed area on the photoresist layer.

(Step 106) Development: The exposed area is cleaned by a developer to wash away the photoresist layer in the exposed area in order to expose the indium tin oxide film.

(Step 107) Etching: The indium tin oxide film exposed from the exposed area is rinsed by royal water.

(Step 108) Stripping: An alkaline solution, preferably sodium hydroxide (KOH), is used for rinsing the masked pattern area to dissolve the photoresist layer on the masked pattern area, so that the required ITO transparent electrodes can be formed on the transparent glass substrate.

(Step 109) After-etch Inspection: The electrodes of the transparent glass substrate are inspected. If there is any short circuit found between the ITO electrodes, then the point of short circuit will be removed by a laser correction machine, so as to complete the fabrication of the ITO glass and prepare for the later process to install the transparent glass substrate into the touch panel.

When the ITO glass is used as an LCD display, users often observe a discontinuous layer, a blurred image, a particle formation or a reduced resolution of the display screen through the ITO glass, since the refractive index of the light at each position of the ITO glass is different. Referring to FIG. 2 for the ITO glass 1 produced by the foregoing process, the ITO glass 1 comprises a transparent glass substrate 10 and a plurality of ITO transparent electrodes 12 disposed on the transparent glass substrate. The refractive index of light at the positions of the transparent glass substrate 10 without the ITO transparent electrodes 12 ranges between 1.4 and 1.5, and the refractive index of light of the ITO transparent electrodes 12 ranges from 1.8 to 2.2. Since the refractive indexes of the two are different, the image quality of the screen observed by users will be lowered greatly, and the images of smaller graphics and texts will become blurred, and thus users may not be able to successfully press the correct buttons on the screen to execute a control instruction corresponding to the button position, and thus users may not be able to input their desired data or instruction successfully.

SUMMARY OF THE INVENTION

In view of the shortcomings of the prior art and a different refractive index of light at each position of the traditional ITO glass that often causes a discontinuous layer, a blurred image, a display particle or a reduced resolution observed by users through the ITO glass, the inventor of the present invention based on years of experience to conduct extensive researches and experiments, and finally designed and developed a method of hiding transparent electrodes on a transparent substrate in accordance with the present invention.

Therefore, it is a primary objective of the present invention to provide a method of hiding transparent electrodes on a transparent substrate, and the method coats a solution of non-conductive nanoparticles onto the transparent substrate and the transparent electrodes after forming a plurality of transparent electrodes on the transparent substrate, and the refractive indexes of light for both non-conductive nanoparticles and the transparent electrodes are the same. After a high-temperature thermal processing is performed to the transparent substrate for a thermal processing time, an even mask is formed on the transparent substrate and the transparent electrodes, such that the non-conductive nanoparticles in the mask provide the same refractive index of light for the positions of the transparent substrate with and without the transparent electrodes, so as to effectively prevent a different refractive index of light at any position of the transparent substrate that will cause a poor image quality of the screen.

The above and other objects, features and advantages of the present invention will become apparent from the following detailed description taken with the accompanying drawings.

DETAILED DESCRIPTION OF THE PREFERRED EMBODIMENTS

Figure 1:
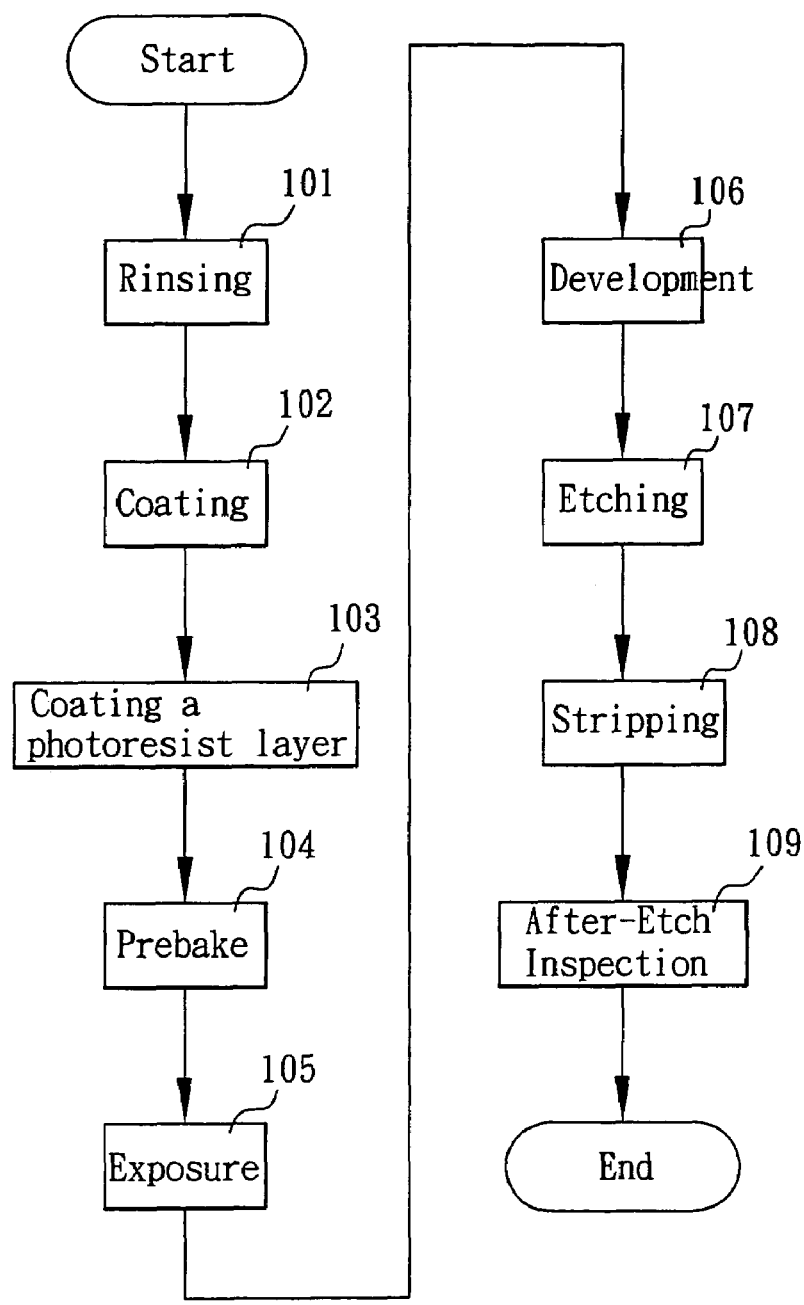
FIG. 1 is a flow chart of fabricating a prior art ITO glass.
Figure 2:
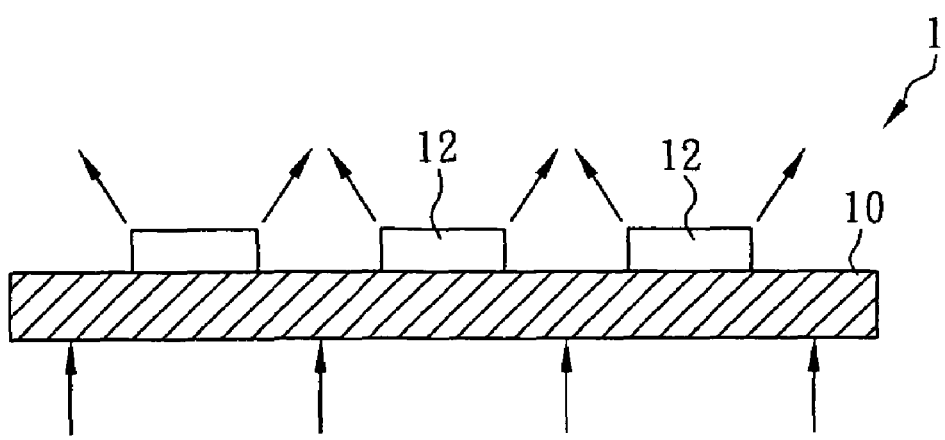
FIG. 2 is a schematic view of a prior art ITO glass.
Figure 3:
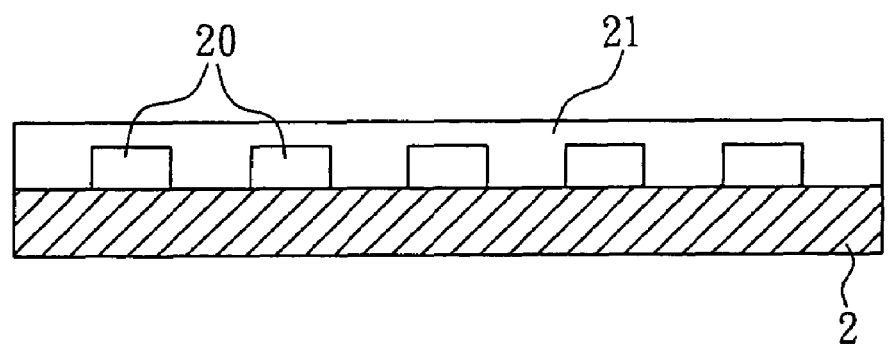
FIG. 3 is a schematic view of a transparent substrate of the invention.

Referring to FIG. 3 for a method of hiding transparent electrodes on a transparent substrate in accordance with the present invention, the method forms a plurality of transparent electrodes 20 on a transparent substrate 2, and then coats a solution of non-conductive nanoparticles onto the transparent substrate 2 and the transparent electrodes 20. The refractive indexes of light for both non-conductive nanoparticles and transparent electrodes 20 are the same, and then the transparent substrate 2 is processed by a high-temperature thermal processing for a thermal processing time, and a flat and even mask 21 is formed on the transparent substrate 2 and the transparent electrodes 20. With the non-conductive nanoparticles in the mask 21, the refractive indexes of light at the positions of the transparent substrate 2 with or without the transparent electrodes 20 are the same, so as to effectively prevent a different refractive index of light at any position of the transparent substrate 2 that will cause a poor image quality on the screen.

Figure 4:
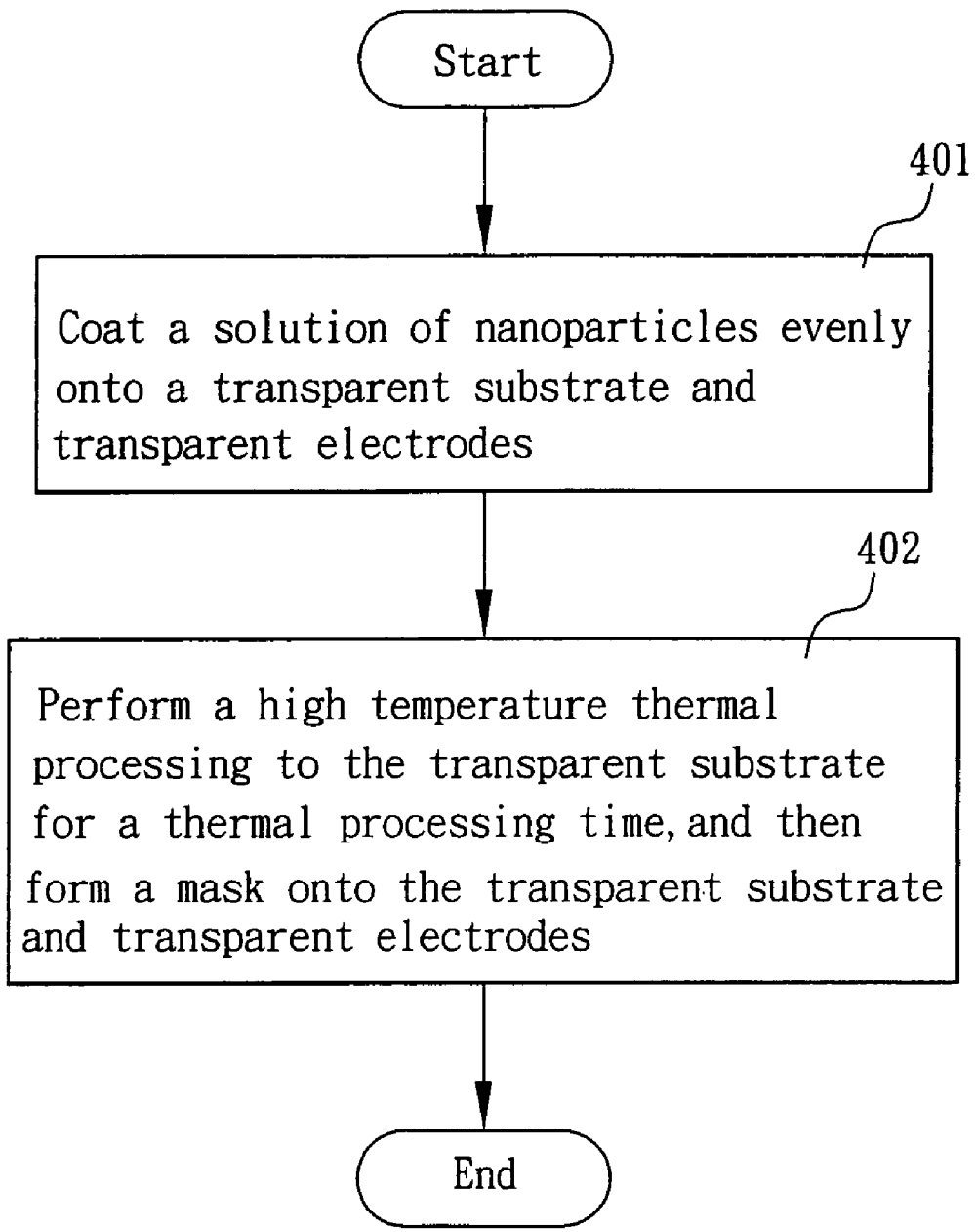
FIG. 4 is a flow chart of fabricating a transparent substrate and a mask of the invention.

Referring to FIG. 4 for the method used for processing a transparent substrate having a plurality of transparent electrodes 20 according to the present invention, the method comprises the steps of:

(Step 401) forming a solution of non-conductive nanoparticles having a refractive index of light equal to that of the transparent electrode 20, and evenly coating the solution onto the transparent substrate 2 and the transparent electrodes 20; and (Step 402) forming a flat and even mask 21 on the transparent substrate 2 and the transparent electrodes 20, after performing a high-temperature thermal processing to the transparent substrate 2 for a thermal processing time.

Figure 5:
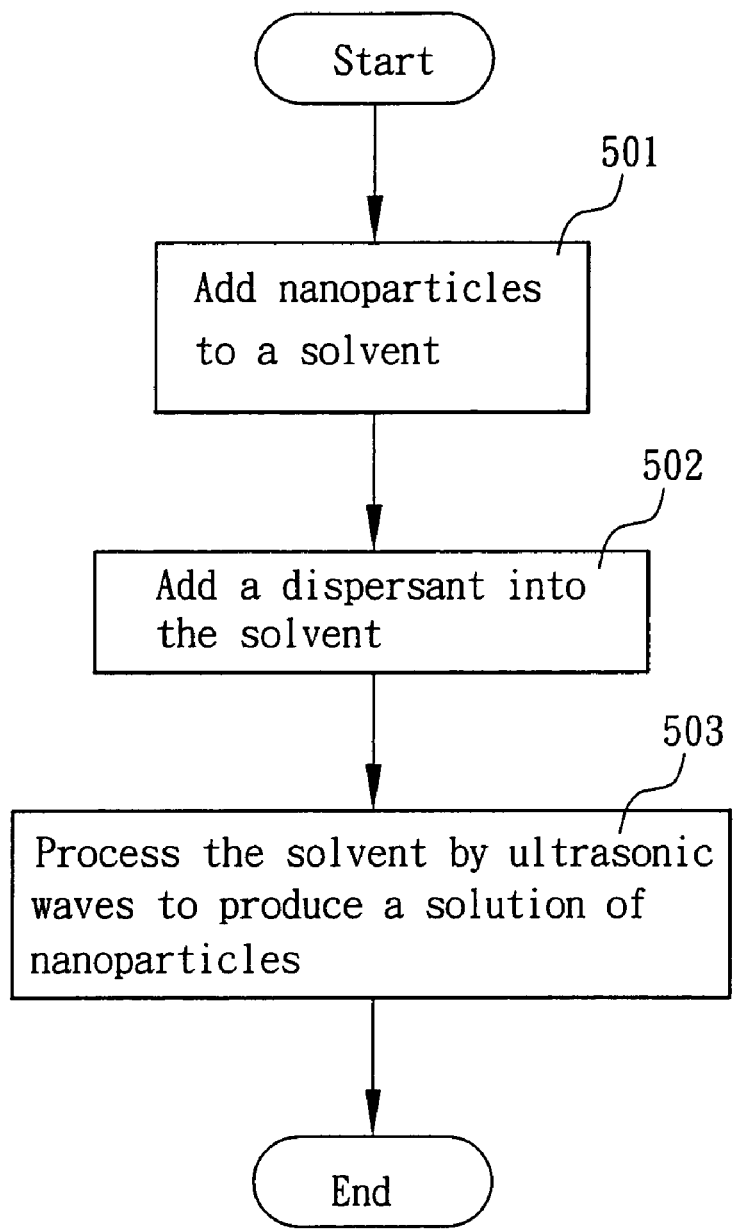
FIG. 5 is a flow chart of a preferred embodiment of the invention.

Referring to FIG. 5 for a preferred embodiment of the present invention, the method carries out the following process before forming a solution of non-conductive nanoparticles and coating the solution onto the transparent substrate 2 and the transparent electrodes 20, and such process comprises the steps of:

(Step 501) adding a solvent to the non-conductive nanoparticles;

(Step 502) adding a dispersant into the solvent; and (Step 503) processing the solvent by ultrasonic waves, so that the non-conductive nanoparticles are evenly dispersed in the solvent to produce the solution, and the non-conductive nanoparticle can be coated evenly onto the transparent substrate 2 and the transparent electrodes 20.

In FIG. 3, the refractive index of light for the non-conductive nanoparticles ranges from 1.8 to 2.2, and the non-conductive nanoparticles could be made of antimony (II) trioxide ($Sb_2O_3$), chromium (II) trioxide ($Cr_2O_3$), indium (II) trioxide ($In_2O_3$), tantanium (II) trioxide ($Ta_2O_3$), titanium dioxide ($TiO_2$) or zirconium oxide ($ZrO_2$) or their mixture, and the size of the nanoparticles ranges from 10 nm to 100 nm, such that when the nanoparticles are evenly coated onto the transparent substrate 2 and the transparent electrodes 20 to form a flat and even mask 21, the nanoparticles maintain the refractive index of light at the positions of the transparent substrate 2 with or without the transparent electrodes 20 in the range from 1.8 to 2.2 to effectively overcome the shortcomings of the ITO glass that causes a blurred image, a particle formation and a reduced resolution due to the different refractive indexes of light at different positions of the ITO glass.

In this preferred embodiment, the solvent is processed by ultrasonic waves and an adhesive is added into the solvent, before the dispersant is added to the solvent. The adhesive could be a siloxane compound, and the solvent could be ethanol, so that the solution of nanoparticles can be produced after processing by ultrasonic waves. After the solution of nanoparticles is coated onto the transparent substrate 2 and the transparent electrodes, the transparent substrate 2 is processed for at least 30 minutes, and the temperature of the high-temperature thermal processing is maintained in a range from 100° C. to 200° C. to evenly form a flat and even mask 21 onto the transparent substrate 2 and the transparent electrodes 20, so that the nanoparticles can be attached evenly onto the transparent substrate 2 and the transparent electrodes 20.

Figure 6:
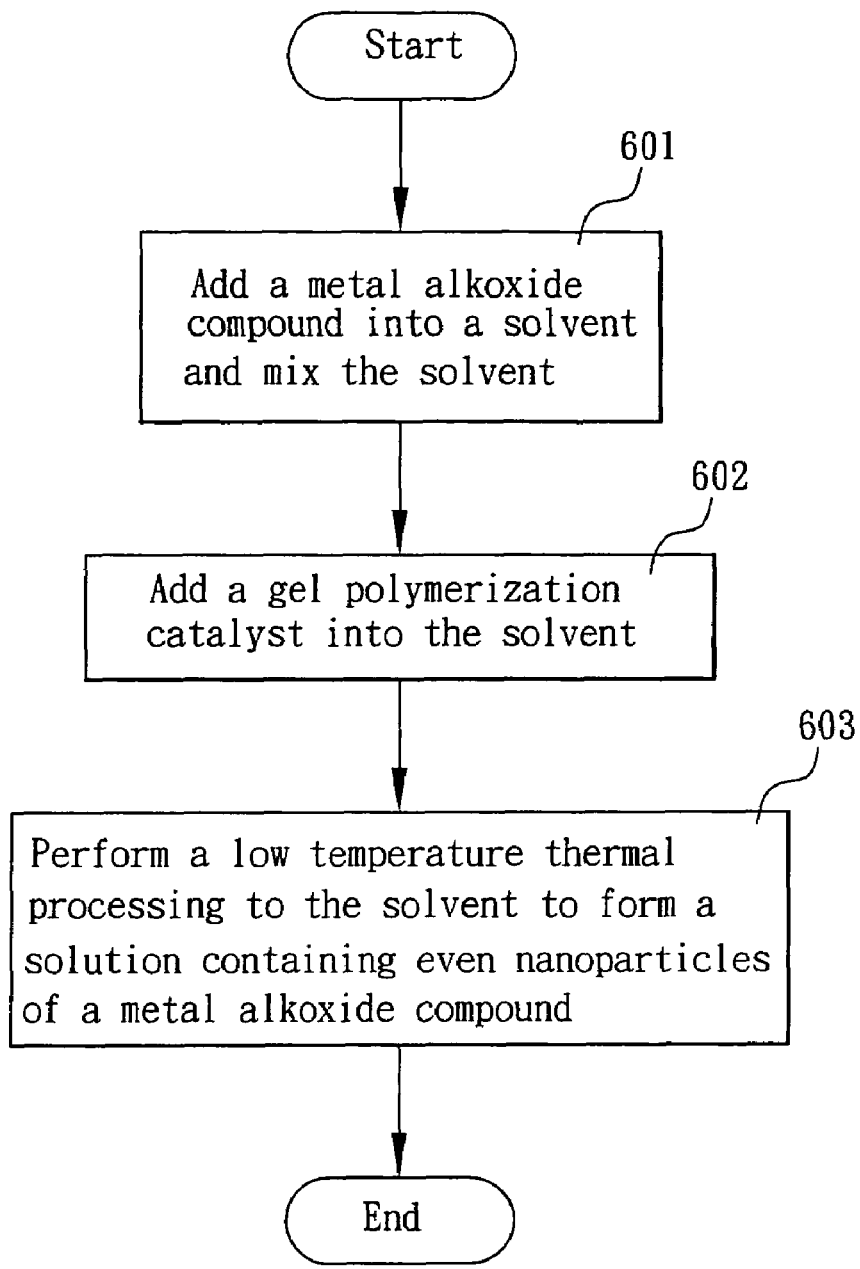
FIG. 6 is a flow chart of another preferred embodiment of the invention.

Referring to FIG. 6 for another preferred embodiment of the present invention, the method of producing the solution of non-conductive nanoparticles comprises the steps of:

(Step 601) adding a metal alkoxide compound into a solvent and mixing the solvent;

(Step 602) adding a gel polymerization catalyst into the solvent; and (Step 603) performing a low-temperature thermal processing to the solvent at a temperature ranging from 50° C. to 80° C. for a reaction time required for a so-gel process, so as to form a solution containing even nanoparticles of a metal alkoxide compound.

In FIG. 3, the nanoparticles of the metal alkoxide compound have a refractive index of light ranging from 1.8 to 2.2 and the metal alkoxide compound could be titanium (IV) butoxide ($Ti(OCH_2CH_2CH_2CH_3)_4$), so that when the nanoparticles of the metal alkoxide compound are evenly coated onto the transparent substrate 2 and the transparent electrodes 20 to form a flat and even mask 21, the nanoparticles of the metal alkoxide compound can maintain the refractive index of light at the positions of the transparent substrate 2 with and without the transparent electrodes 20 within the range from 1.8 to 2.2, so as to effectively overcome the shortcomings of the traditional ITO glass having a blurred image, a color difference, a particle formation, or a reduced resolution due to the different refractive indexes of light at different positions of the ITO glass.

In another preferred embodiment, the solvent could be acetylacetone, and the gel polymerization catalyst could be nitric acid and water. After the solvent has gone through a so-gel process for at least 60 minutes, the solution of nanoparticles of the metal alkoxide compound is produced, and the solution is coated onto the transparent substrate 2 and the transparent electrodes 20. After the transparent substrate 2 has gone through the high-temperature thermal processing process for at a temperature ranging from 200° C. to 300° C. for at least 60 minutes to form a flat and even mask 21 onto the transparent substrate 2 and the transparent electrodes 20, such that the nanoparticles of the metal alkoxide compound can be attached evenly onto the transparent substrate 2 and the transparent electrodes 20.

The method of the present invention not only can eliminate the etching lines formed between the transparent substrate 2 and the transparent electrodes 20 that may result adverse effects, but also can effectively overcome the poor image quality of the screen caused by different refractive indexes of light at the positions of the transparent substrate 2 with and without the transparent electrodes 20.

While the invention herein disclosed has been described by means of specific embodiments, numerous modifications and variations could be made thereto by those skilled in the art without departing from the scope and spirit of the invention set forth in the claims.

What is claimed is:

1. A method of hiding transparent electrodes on a transparent substrate, which is applied on a transparent substrate for installing a plurality of transparent electrodes thereon, comprising the steps of:
   coating a solution of non-conductive nanoparticles having a refractive index equal to the refractive index of said transparent electrodes onto said transparent substrate and said transparent electrodes; and
   forming a flat and even mask onto said transparent substrate and said transparent electrodes, after performing a high-temperature thermal processing to said transparent substrate for a thermal processing time.

2. The method of claim 1, further comprising a process performed before said solution is coated onto said transparent substrate and said transparent electrode, and said process comprises the steps of:
   adding a solvent to said non-conductive nanoparticles;
   adding a dispersant into said solvent; and
   evenly dispersing said non-conductive nanoparticles in said solvent to produce said solution by using ultrasonic waves.

3. The method of claim 2, further comprising a step of adding an adhesive into said solvent, after said dispersant is added to said solvent and before said solvent is processed by ultrasonic waves.

4. The method of claim 3, wherein said non-conductive nanoparticle has a refractive index ranging from 1.8 to 2.2 and could be made of antimony (II) trioxide ($Sb_2O_3$), chromium (II) trioxide ($Cr_2O_3$), Indium (II) trioxide ($In_2O_3$), tantanium (II) trioxide ($Ta_2O_3$), titanium dioxide ($TiO_2$), or zirconium oxide ($ZrO_2$) or a mixture of the above.

5. The method of claim 4, wherein said adhesive is a siloxane compound.

6. The method of claim 5, wherein said solvent is an ethanol solution.

7. The method of claim 6, wherein said non-conductive nanoparticle has a size ranging from 10 nm to 100 nm.

8. The method of claim 7, wherein said high-temperature thermal processing is performed at a temperature ranging from 100° C. to 200° C.

9. The method of claim 1, further comprising a process performed before coating said solution, and said process comprises the steps of:
   adding a metal alkoxide compound into a solvent and mixing said solvent;
   adding a gel polymerization catalyst into said solvent;
   performing a low-temperature thermal processing to said solvent for a reaction time to produce said solution having said non-conductive nanoparticles.

10. The method of claim 9, wherein said metal alkoxide compound is titanium (IV) butoxide ($Ti(OCH_2CH_2CH_2CH_3)_4$).

11. The method of claim 10, wherein said solvent is an acetylacetone solvent.

12. The method of claim 11, wherein said gel polymerization catalyst is comprised of nitric acid and water.

13. The method of claim 12, wherein said high-temperature thermal processing is performed at a temperature ranging from 200° C. to 300° C.

14. The method of claim 13, wherein said low-temperature thermal processing is performed at a temperature ranging from 50° C. to 80° C.

* * * * *